June 19, 1934.  A. G. MADDIGAN  1,963,919
LUBRICATING APPARATUS
Filed Jan. 21, 1932   2 Sheets-Sheet 1
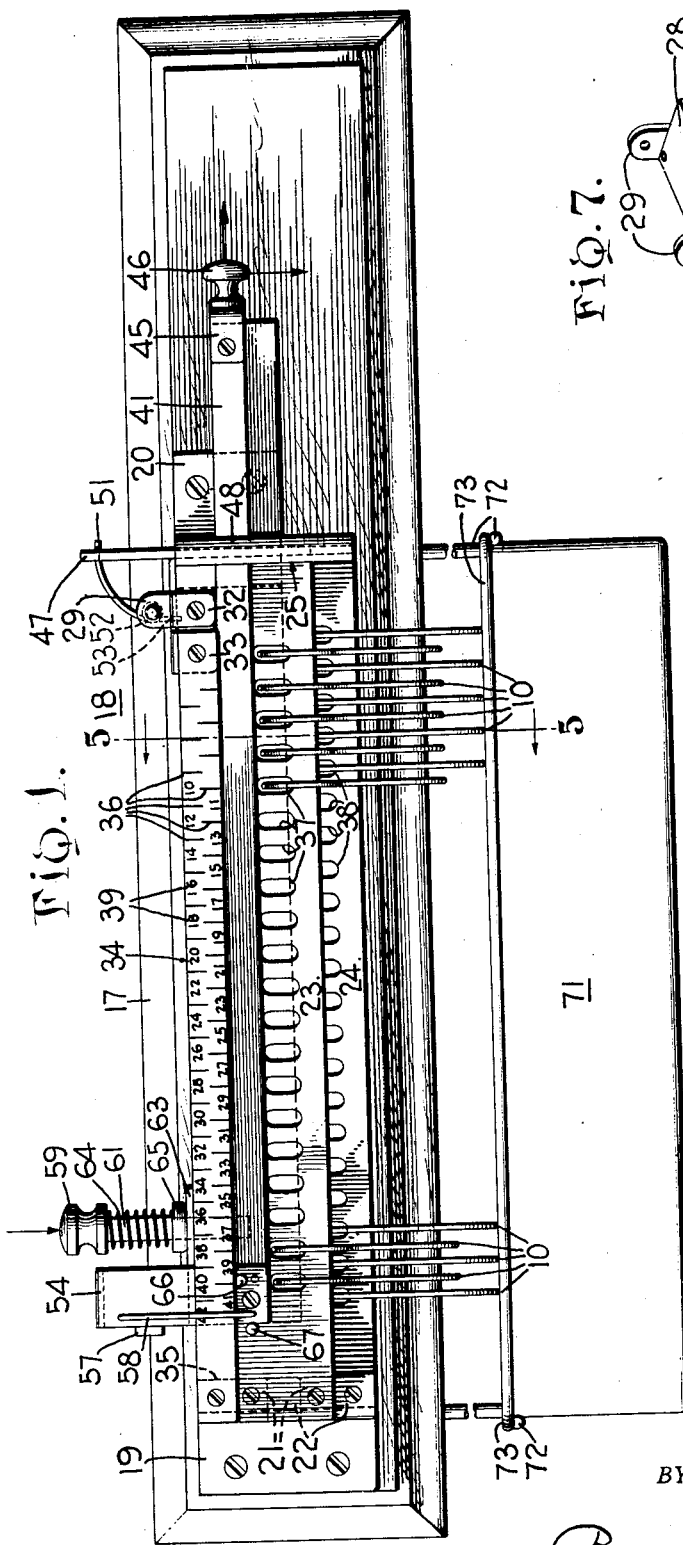
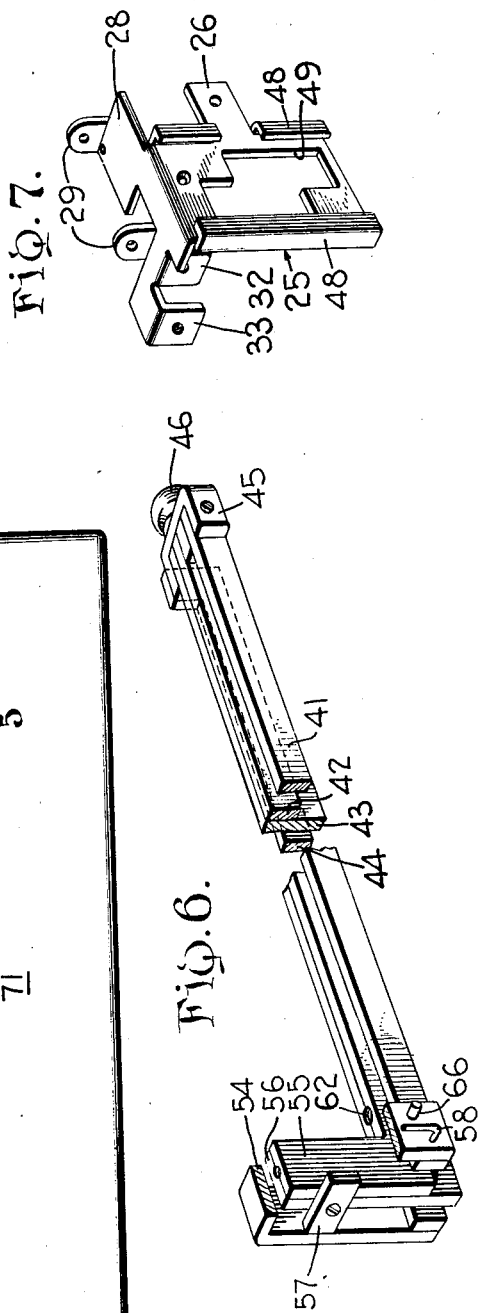
INVENTOR
BY Arthur G. Maddigan,
Bean & Brooks  ATTORNEYS June 19, 1934.  A. G. MADDIGAN  1,963,919
LUBRICATING APPARATUS
Filed Jan. 21, 1932  2 Sheets-Sheet 2
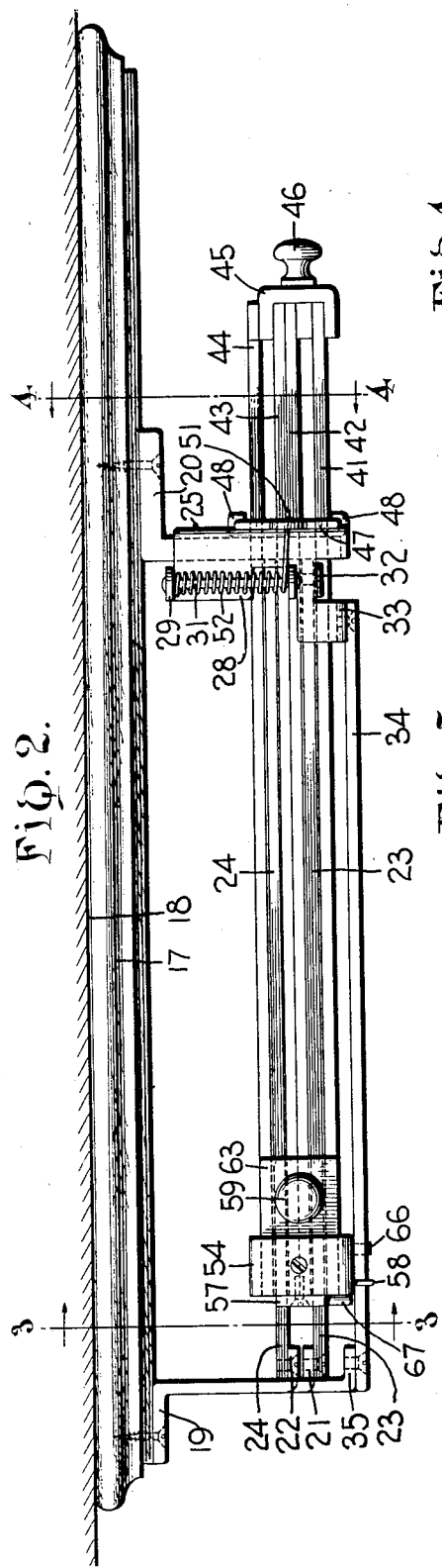
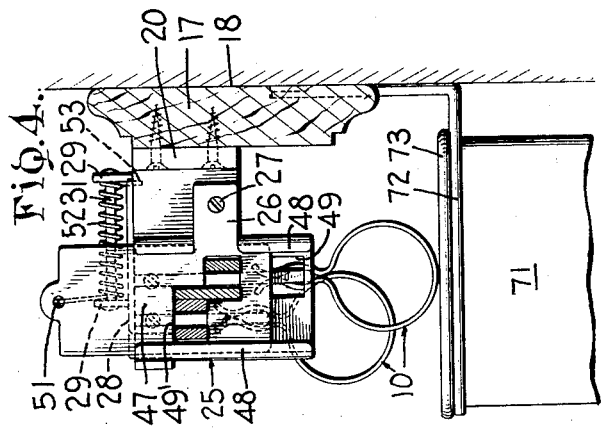
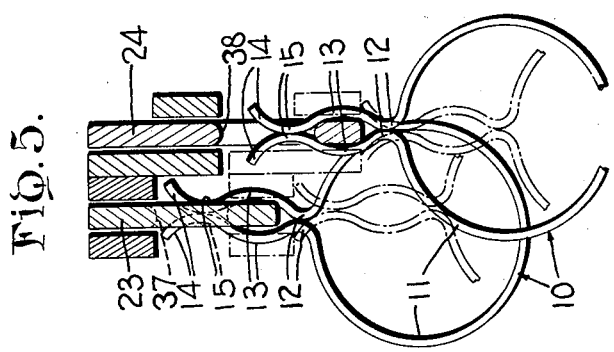
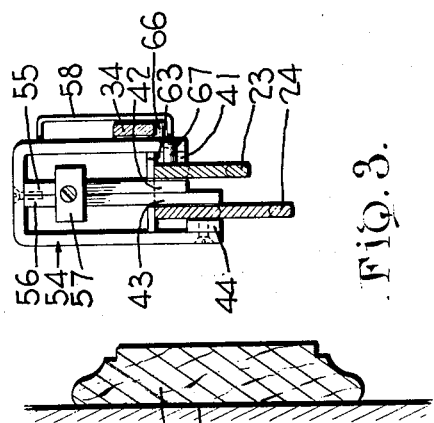
INVENTOR
Arthur G. Maddigan,
BY
Bean + Brooks.  ATTORNEYS Patented June 19, 1934

1,963,919

UNITED STATES PATENT OFFICE 1,963,919

LUBRICATING APPARATUS

Arthur G. Maddigan, Buffalo, N. Y., assignor to Every Point Guaranteed Lubricating System, Inc., Buffalo, N. Y., a corporation of New York Application January 21, 1932, Serial No. 588,013

12 Claims. (Cl. 40—19.5)

This invention relates to apparatus for use in connection with the lubrication of motor vehicles, machines, and the like, and has particular reference to an improved device adapted for use in the system of lubricating described in United States Letters Patent No. 1,833,513, issued on November 24, 1931, to Barton A. Bean, Jr., and myself.

The apparatus there described includes a plurality of signals adapted to be removably attached to a machine to be lubricated, adjacent the points of lubrication thereon, and mechanism for supporting a large number of such signals and for dispensing any particular number of them. The system described includes the determination of the number of points on the machine which requires lubrication; the removal of a corresponding number of signals from the supporting and dispensing mechanism, the attachment of the signals so removed to the machine, one adjacent each point to be lubricated to visibly indicate the same; the lubrication of such points as guided and indicated by the signals, and the removal of one signal as or after the point indicated by it is lubricated, whereby the removal of all the signals from the machine will assure and indicate that every point thereon has been lubricated. The signals are then replaced in the supporting and dispensing mechanism, such replacement serving to additionally check the lubrication, since the returned signals, if all have been removed from the machine which has been lubricated, will completely fill the dispensing mechanism.

The present invention relates to an improved supporting and dispensing mechanism for the signals, and to an improved signal adapted to coact with such mechanism. The latter is compactly formed to accommodate a large number of signals in a relatively small space, and adapted to be readily adjusted so that by a single movement any desired predetermined number of signals supported by it may be released for attachment to the machine to be greased. The parts which normally support the signals are adapted to readily receive them in such spaced relationship that an operator may observe at a glance how many signals, if any, are absent from the mechanism, and when the signals have been dispensed and then replaced in the mechanism, how many, if any, are missing, thereby indicating the number of points, on the machine to be lubricated, that have not been lubricated.

These and other objects and advantages of the invention, including those inherent in the arrangement and formation of the parts of the apparatus which are set forth in the appended claims, will become apparent from the following description of the typical embodiment of the invention illustrated in the accompanying drawings, wherein:

Fig. 1 is a front elevation of the mechanism in normal position with a number of the signals supported thereby;

Fig. 2 is a plan view of the mechanism with the parts thereof in the position shown in Fig. 1;

Fig. 3 is a vertical section taken on line 3—3 of Fig. 2;

Fig. 4 is a vertical sectional view taken on line 4—4 of Fig. 2;

Fig. 5 is a vertical section taken on line 5—5 of Fig. 1, the broken lines indicating the operated position of parts of the dispensing mechanism and a released position of the signals; and Figs. 6 and 7 are perspectives of the actuating or signal releasing member of the mechanism.

As shown in the drawings, the signals, to be attached to a machine to be lubricated, may comprise a wire 10, forming a loop 11, large enough to visibly indicate a place or point to be lubricated, such as a grease or oil fitting used on conventional motor vehicles. The wire is preferably resilient and portions of it, indicated at 12, have been brought together to complete the loop 11. End portions 13 of the wire are of arcuate form, adapted to receive and engage about a point or fitting to be lubricated (not illustrated), the resiliency of the wire permitting spreading of the portions 13 to engage or disengage the signal with or from such fitting. The terminal portions 14 of the wire diverge from points 15 at the outer ends of the portions 13, the points 15 preferably abutting when the wire is unflexed. Terminal portions 14 function as cam parts for spreading the attaching portions 13 when the signal is being attached to a fitting, and further functions in a manner to be described hereinafter.

The signal supporting and dispensing mechanism includes a base 17 adapted to be attached to a building wall 18 or other suitable support. Extending forwardly from the base are spaced brackets 19 and 20. Bracket 19 has flanges 21 and 22, directed toward bracket 20, and parallel signal supporting bars 23 and 24 having their adjacent ends attached to the respective flanges, likewise have their opposite ends supported by bracket 20.

A plurality of spaced recesses 37 and 38 are formed across the respective supporting bars 23 and 24 for receiving portions 14, 15 of the signals. The recesses 37 are staggered with respect to recesses 38 in order that the signals supported by bar 23 will be spaced from those supported by bar 24, as shown in Fig. 1. Recesses 38 are below recesses 37 in order that signals attached to the forward supporting bar 23 will not interfere with the attachment of signals to the rear supporting bar 24.

A bracket member 25 has a vertical wall disposed adjacent the bracket 20 and a lug 26 secured to the bracket at 27. A horizontal part 28 extending from the vertical wall, has a pair of spaced upturned flanges 29 carrying a pin 31 and a pair of horizontal flanges 32 and 33 respectively secured to end portions of suporting bar 23 and an index strip 34. The opposite end of the latter is supported by an extension 35 of bracket 19.

The index strip parallels supporting bars 23, 24, and is graduated, as shown in Fig. 1, one graduation, 36, occurring directly in front of each recess 37, 38. Indicia 39, applied to the index strip at each graduation, indicate the total number of recesses and signals which occur from one end, at the right of Fig. 1, of the supporting bars to any particular graduation.

The actuating or dispensing means, for disengaging the signals from the supporting bars 23, 24, include a pair of bars 41, 42, one on each side of bar 23, and a pair of bars 43, 44, the latter pair of bars extending below bars 41, 42 a distance substantially equal to the vertical distance between recesses 37 and recesses 38. Bars 41, 42, 43, 44 extend through an opening 49 in the vertical wall of bracket 25 and are joined together at one end (depicted at the right of Figs. 1 and 2) by a clip 45 to which a handle 46 is attached.

A plate 47, guided for vertical movement by flange guides 48 on bracket 25, has an opening 49' slidably receiving the bars 41, 42, 43, 44. Engaged in an opening in the plate is one end 51 of a spring 52 coiled about pin 31. The spring is normally tensioned, with its opposite end 53 fixed to part 28, so that the plate is retained in its uppermost position, wherein it holds the bars 41 to 44, inclusive, in their uppermost position (see Figs. 1, 2, 3, 4, and in full lines of Fig. 5), in abutment with the upper wall of the opening 49 in the bracket 25.

The ends of the actuating bars opposite handle 46 are joined, as shown in Figs. 3 and 6, by an inverted U-member 54. The end portions 55 and 56, respectively, of bars 42 and 43 are upturned and are secured to the web of member 54 by a screw or equivalent means. Secured to portions 55 and 56, at a distance above bars 23 and 24 approximately equal to the distance between the bottom on the latter bars and the bottom wall of opening 49 in bracket 25, is a stop 57. Disposed at a distance, from the outer ends of actuating bars 41 to 44 inclusive (the ends at the left of Fig. 1), substantially equal to one-half the distance between adjacent graduations 36, and carried by the member 54, is an indicator wire 58. The latter overlies the index strip, and, by reason of its disposition, the number of signals 10 disposed beneath the bars 41 to 44 inclusive will always equal the number, 39, appearing beside the graduation on the index strip behind the indicator wire, regardless of the longitudinal position (the position from left to right in Fig. 1) of the actuator bars with respect to the supporting bars 23, 24.

A handle 59, disposed adjacent member 54, has a shank 61 threaded into an opening 62 in bars 42, 43. The shank passes through an opening in a bridge plate 63 resting upon supporting bars 23, 24. Spring 64 is coiled about the shank and is compressed between the handle 59 and a washer 65 resting upon the bridge plate. The spring is of sufficient strength to normally retain the ends of the bars 41 to 44, inclusive, in their uppermost position, shown in Fig. 1, this position being limited by the abutment of a stop pin 66, carried by member 54, with the bottom of the index strip 34. To limit the longitudinal movement of the actuating bar assembly, there is provided a stop pin 67, carried by supporting bar 23, for abutment with member 54 when the movable parts are in the limit position (to the left, as the device is illustrated), shown in Figs. 1 and 2.

A basket 71, of size sufficient to underlie all of the signals 10 on the bars 23, 24, is removably supported by arms 72 extended from the base 17, the basket having a flanged edge 73 resting on the arms. The basket may be used to receive signals 10 dispensed from the mechanism and to convey such signals to and from the machine to be lubricated.

In operation of the mechanism with the signals all in place on the supporting bars, the actuator bar mechanism is shifted longitudinally by moving handles 59 or 46, until the numeral on the index strip, indicated by wire 58, corresponds to the number of points on the machine to be lubricated. The operator then applies pressure downwardly upon handles 46 and 59, moving the bars 41, 42, 43, 44 downwardly, to the broken line position indicated in Fig. 5, against the resistance of springs 52 and 64, until stop 57 abuts the upper edges of supporting bars 23, 24 and the lower edges of the actuating bars abut the lower wall of opening 49 in bracket 25, when the actuating bars will be in the broken line position of Fig. 5. As the actuating bars move downwardly they will abut terminal portions 14 of the signals 10 that are in vertical alignment with the bars. As movement continues such signals will be pushed from supporting bars 23, 24 and will drop into the basket 71. The number of such signals will correspond to the number indicated on the index strip by indicator wire 58.

The basket containing the signals may then be taken to the machine to be lubricated; the signals attached to the points of lubrication, and, after all are attached, removed one by one, as such points are attended to, and replaced in the basket. A count of the replaced signals should indicate the number indicated on the index strip, and should it fail to do so, an indication is given that one or more points have not been lubricated, the number of such points being the difference between the number indicated on the index strip and the signals counted. Or, a check may be effected by replacing the returned signals on the supporting bars 23, 24, since any unfilled signal retaining recesses 37, 38 will indicate that a signal has not been removed from the machine or vehicle lubricated.

It will be understood that in replacing the signals upon the supporting bars, the terminal portions 14 will be pressed thereagainst, and will, by camming action, spread the signal loops and portions 15 thereof, allowing such portions to pass the parts of the supporting bars disposed beneath the recesses 37, 38. When the terminal portions 14 enter the recesses the loops and portions 15 will become unflexed and will retain the signals in place. Terminal portions 14 of the signals, it should be noted, are of greater extent than the width of the supporting bars 23, 24 to permit of the actuating bars, disposed one on each side the supporting bars, to engage such portions. The signals, if desired, may be colored, or may carry markers of color, to render them more visible when attached to the machine to be lubricated.

It will be further understood that the apparatus described and illustrated herein is merely exemplary of the inventive principles involved, and that such principles may be applied with advantage to devices having other structural characteristics and arrangements, all within the perview of this invention.

What I claim is:

1. In apparatus for lubricating a machine, a plurality of signals adapted for attachment to lubrication points of the machine, a pair of parallel bars each having a plurality of means for releasably supporting one of said signals, said means being spaced along edges of the bars, and the means on one bar being staggered with respect to the means on the other bar, signal releasing means including a member selectively movable longitudinally along the edges of said bars opposite the signal supporting means to a position overlying a selected number of signals, and means for moving the releasing means toward said last mentioned signals to release the same from the bars.

2. In apparatus for lubricating a machine, a pair of parallel bars each having signal supporting means spaced therealong, the signal supporting means of one bar being staggered with respect to those of the other bar, signals adapted for attachment to lubrication points on a machine, said signals being releasably supported by each supporting means, and means for releasing a selected number of signals from said bars.

3. In apparatus for lubricating a machine, a plurality of signals adapted for attachment to lubrication points of the machine, a pair of parallel bars each having a plurality of means, each for releasably supporting one of said signals, said means being spaced along edges of the bars, and the means on one bar being staggered with respect to the means on the other bar, signal releasing means including a member movable longitudinally along the edges of said bars opposite the signal supporting means to a predetermined position overlying a selected number of signals, means for moving the releasing means toward said last mentioned signals to release the same from the bars, and means operable by and upon longitudinal movement of the signal releasing means for indicating the number of signals that will be released.

4. In apparatus for lubricating a machine, a plurality of signals adapted for attachment to lubrication points of the machine, a pair of parallel bars each having a plurality of means, each for releasably supporting one of said signals, said means being spaced along edges of the bars, and the means on one bar being staggered with respect to the means on the other bar, signal releasing means including a member movable longitudinally along the edges of said bars opposite the signal supporting means to a predetermined position overlying a selected number of signals, means for moving the releasing means toward said last mentioned signals to release the same from the bars, and means operable by and upon longitudinal movement of the signal releasing means for indicating the number of signals that will be released, said last mentioned means comprising an index strip paralleling said bars and having graduations alinged with the signal supporting means, and an indicator carried by the signal releasing means.

5. In apparatus for lubricating a machine, a pair of parallel bars each having signal supporting means spaced therealong, the signal supporting means of one bar being staggered with respect to those of the other bar, signals adapted for attachment to lubrication points on a machine, said signals being releasably supported by each supporting means, means for releasing a selected number of signals from said bars, and a basket disposed beneath said bars for receiving the signals released from said bars.

6. In apparatus for lubricating a machine, a plurality of signals adapted for attachment to lubrication points of the machine, a pair of parallel bars each having along its lower edge a plurality of spaced means each for releasably supporting one of said signals, the means on one bar being staggered with respect to the means on the other bar, signal releasing means including a member movable longitudinally along the upper edges of the bars to selectively overlie a selected number of said signals, resilient means for normally retaining said member in an upward position out of contact with said signals, and means for moving said member downwardly to abut the selected number of said signals and to disengage them from the bars.

7. In an apparatus for checking the lubrication of a machine, a pair of relatively movable members in the apparatus, a signal comprising a return bent wire having substantially arcuate end portions to form a projecting substantially closed loop-like figure, said end portions terminating in outwardly diverging fingers, one of the relatively movable members being normally engaged by the arcuate portions of the signal to support the latter, the spread of the diverging terminal fingers being greater than the overall width of said arcuate portions, and at least one of said fingers being normally located in the path of relative movement of said members, whereby one of the diverging terminal fingers is moved to disengage the signal upon relative movement of said members.

8. Apparatus for checking the lubrication of a machine, comprising a signal supporting bar having a plurality of recesses therealong, a signal normally engaged with the bar at each recess, each of said signals having resilient portions adjacent a recess of the bar and having portions extending into the recess, one of the latter portions terminating in an outwardly directed portion extending beyond said recess, and signal releasing means normally out of contact with said outwardly directed portion of the signal and movable thereagainst for displacing the signal from the bar.

9. In apparatus for checking the lubrication of a machine, a bar having a plurality of means therealong each for releasably supporting a signal, a plurality of signals releasably supported by said means, a signal displacing member, means for supporting said member to allow it movement longitudinally of the bar and limited movement transversely of the bar including resilient means for normally holding the member out of contact with said signals, and said member being movable to move against any selected number of the signals to release them from the releasable supporting means.

10. In apparatus for checking the lubrication of a machine, a bar having spaced means therealong for releasably supporting signals, an actuating member movable in parallelism to the bar and movable transversely of the bar into contact with the signals, resilient means for normally holding the actuating member out of contact with the signals, whereby said actuating member may be moved into an initial position from which it then may be moved against any selected number of the signals for removing them from the releasable supporting means, and means for indicating, when the actuating member is in said initial position, the number of signals which will be removed by subsequent movement of it.

11. Apparatus for checking the lubrication of a machine, comprising a plurality of signals adapted to be attached to points of lubrication on such machine, a member for normally supporting said signals, the latter each having a portion for detachably engaging said member and a portion extended laterally beyond one wall of said member, and an actuating element movable relative to said member to positions adjacent different numbers of the signals, and said element being movable toward said signals in a plane of movement parallel to said one wall of said member for engaging the laterally extended portions of signals and for moving them from engagement with the member.

12. Apparatus for checking the lubrication of a machine, comprising a signal supporting bar having a plurality of recesses therealong, a signal normally engaged with the bar at each recess, each of said signals having resilient portions engaging a part of the bar adjacent one recess and having portions extending in said recess, the latter portions terminating in diverging portions extending beyond said recess, and signal dispensing means movable longitudinally of the bar, said means being normally out of contact with said diverging portions of the signal, and means for moving the signal dispensing means toward said diverging portions of the signals to disengage the latter from the bar, the number of signals removed depending upon the longitudinal position of the signal dispensing means.

ARTHUR G. MADDIGAN.